US010859203B1

(12) United States Patent
Cui et al.

(10) Patent No.: US 10,859,203 B1
(45) Date of Patent: Dec. 8, 2020

(54) HIGH-LOW PRESSURE LUBRICATION SYSTEM FOR HIGH-HORSEPOWER PLUNGER PUMP

(71) Applicant: AMERICAN JEREH INTERNATIONAL CORPORATION, Houston, TX (US)

(72) Inventors: Haiping Cui, Yantai (CN); Wenping Cui, Yantai (CN); Jixin Wang, Yantai (CN); Xiaosong Wei, Yantai (CN); Peng Li, Yantai (CN); Wenjie Deng, Yantai (CN)

(73) Assignee: American Jereh International Corporation, Houston, TX (US)

( * ) Notice: Subject to any disclaimer, the term of this patent is extended or adjusted under 35 U.S.C. 154(b) by 0 days.

(21) Appl. No.: 16/816,261

(22) Filed: Mar. 12, 2020

(51) Int. Cl.
*F16N 7/40* (2006.01)
*F16N 25/00* (2006.01)
(Continued)

(52) U.S. Cl.
CPC ............... *F16N 7/40* (2013.01); *F16N 25/00* (2013.01); *F16N 39/02* (2013.01); *F16N 39/06* (2013.01);
(Continued)

(58) Field of Classification Search
CPC . F16N 7/40; F16N 25/00; F16N 39/02; F16N 39/06; F04B 47/02; F04B 47/12; F01M 1/02; F01M 1/10
See application file for complete search history.

(56) References Cited

U.S. PATENT DOCUMENTS 4,478,423 A * 10/1984 Hjelsand ............... F16J 15/183
277/516
5,769,182 A * 6/1998 Parenteau ............... F16N 7/40
184/104.1
(Continued)

*Primary Examiner* — Michael R Mansen
*Assistant Examiner* — Robert T Reese

(57) ABSTRACT

The invention discloses a high-low pressure lubrication system for a high-horsepower plunger pump, including a high-pressure oil line and a low-pressure oil line, the high-pressure oil line is used for lubricating the connecting rod bearing bushes and the crosshead bearing bushes in the plunger pump, the low-pressure oil line is used for lubricating the crankshaft bearings, the crosshead sliding rails, the reduction gearbox bearing, and the reduction gearbox gear pair in the plunger pump. The beneficial effects are as follows: oil is fed in two passages: a high-pressure oil line and a low-pressure oil line, the high-pressure oil line is used for lubricating the connecting rod bearing bushes and the crosshead bearing bushes, and the low-pressure oil line is used for lubricating the crankshaft bearings, the crosshead sliding rails, the reduction gearbox bearing, and the reduction gearbox gear pair; two oil pumps are employed to supply oil so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities; both the high-pressure oil line and the low-pressure oil line utilize two-stage filtration, which can reduce impurities in the lubricating oil and improve the life time of various components in the plunger pump.

21 Claims, 1 Drawing Sheet

(51) Int. Cl.
*F16N 39/02* (2006.01)
*F16N 39/06* (2006.01)

(52) U.S. Cl.
CPC ...... *F16N 2210/12* (2013.01); *F16N 2210/14* (2013.01); *F16N 2210/16* (2013.01); *F16N 2250/04* (2013.01); *F16N 2250/08* (2013.01)

(56) References Cited

U.S. PATENT DOCUMENTS

| | | | | |
|---|---|---|---|---|
| 5,816,212 | A * | 10/1998 | Lindquist | F01M 1/02 123/196 R |
| 10,352,321 | B2 * | 7/2019 | Byrne | F04B 1/0404 |
| 2004/0136837 | A1 * | 7/2004 | Ganser | F02M 63/0225 417/273 |
| 2009/0217656 | A1 * | 9/2009 | Yoshimoto | F15B 21/042 60/456 |
| 2012/0024631 | A1 * | 2/2012 | Delamour | F16N 7/40 184/6.12 |
| 2012/0285402 | A1 * | 11/2012 | Foster | F02C 7/185 123/41.12 |
| 2013/0025475 | A1 * | 1/2013 | Fahrenbach | F16N 25/00 100/35 |
| 2013/0213633 | A1 * | 8/2013 | Emminger | F28F 27/02 165/281 |
| 2015/0132157 | A1 * | 5/2015 | Whaley | F04B 47/02 417/321 |
| 2016/0177945 | A1 * | 6/2016 | Byrne | F04B 53/18 184/6 |

* cited by examiner

HIGH-LOW PRESSURE LUBRICATION SYSTEM FOR HIGH-HORSEPOWER PLUNGER PUMP

TECHNICAL FIELD

The present invention relates to the technical field of plunger pump lubrication, and specifically to a high-low pressure lubrication system for a high-horsepower plunger pump.

BACKGROUND

With the further development of unconventional oil and gas, shale oil and gas, the operating conditions of fracturing operations are becoming more and more complicated, there are more demands on fracturing equipment, especially the plunger pump. Particularly, unconventional oil and gas operations, that is shale gas fracturing operations, need a high-horsepower plunger pump to work continuously for a long time at high pressure, which challenges the life time of various motion mechanisms of the plunger pump. As one of the key components of the plunger pump, the lubrication system not only lubricate surfaces of various motion mechanisms to reduce frictional resistance and wear, also cool the parts to take away the heat from the friction, and clean the friction surfaces to clear away the impurities. Superior lubrication performances can improve the life time of the plunger pump greatly. Traditional lubrication for the plunger pump commonly employed "oil feed in one passage", in which the lubricating oil entering the main oil line were distributed to lubricate various parts and components of the plunger pump, including bearing bushes, bearings, gears and the like. The problems of this lubrication means were in that, the lubricating oil lines had excessive branches so that the the distribution of lubricating oil become hard to control, on the one hand it's hard to guarantee that the lubricating oil quantity needed for the key components could meet the demands, meanwhile causing a waste of lubricating oil for parts without the need of over-lubrication. Especially for the high-horsepower plunger pump, it requires large quantity of lubricating oil, and the main bearing positions have high lubrication requirements, therefore the uneven distribution of lubricating oil would greatly reduce the overall lubrication effects.

SUMMARY

To overcome the deficiencies in the prior art, an objective of the invention is to provide a high-low pressure lubrication system for a high-horsepower plunger pump, to change the traditional lubrication method of "oil feed in one passage", in which oil is fed in two passages: a high-pressure oil line and a low-pressure oil line, the high-pressure oil line is primarily used for lubricating the connecting rod bearing bushes and the crosshead bearing bushes with higher lubrication requirements, while the low-pressure oil line is primarily used for lubricating the crankshaft bearings, the crosshead sliding rails, the reduction gearbox bearing, and the reduction gearbox gear pair with relatively lower lubrication requirements; two oil pumps are employed to supply oil so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities; both the high-pressure oil line and the low-pressure oil line utilize two-stage filtration, which can reduce impurities in the lubricating oil and improve the life time of various components in the plunger pump. The relief valve, the pressure sensor and the temperature sensor guarantee the operations of the entire lubrication system.

The objective of the invention is achieved by the following technical measures: a high-low pressure lubrication system for a high-horsepower power plunger pump, including a high-pressure oil line and a low-pressure oil line, the high-pressure oil line is used for lubricating the connecting rod bearing bushes and the crosshead bearing bushes in the plunger pump, the low-pressure oil line is used for lubricating the crankshaft bearings, the crosshead sliding rails, the reduction gearbox bearing, and the reduction gearbox gear pair in the plunger pump.

Further, the lubricating oil quantity of the high-low pressure lubrication system is 150-200 L/min.

Further, the rated lubricating oil pressure of the high-pressure oil line is 200-350 PSI.

Further, the rated lubricating oil pressure of the low-pressure oil line is 60-150 PSI.

Further, at the oil inlet of the low-pressure oil line, independent lubricating oil lines are arranged for the reduction gearbox bearing and the reduction gearbox gear pair respectively.

Further, the high-low pressure lubrication system for the high-horsepower plunger pump includes an oil tank, a high-pressure oil inlet pipe, a low-pressure oil inlet pipe, a high-pressure oil return pipe, and a low-pressure oil return pipe, wherein the oil outlet of the oil tank is connected to the oil inlet of the high-pressure oil line of the plunger pump through the high-pressure oil inlet pipe, the oil outlet of the oil tank is connected to the oil inlet of the low-pressure oil line of the plunger pump through the low-pressure oil inlet pipe, the oil outlet of the high-pressure oil line of the plunger pump is connected into the oil tank through the high-pressure oil return pipe, the oil outlet of the low-pressure oil line of the plunger pump is connected into the oil tank through the low-pressure oil return pipe, the high-pressure oil inlet pipe is in parallel with the low-pressure oil inlet pipe, the high-pressure oil return pipe is in parallel with the low-pressure oil return pipe.

Further, the high-pressure oil inlet pipe is provided with a high-pressure oil suction filter, a high-pressure oil pump, a high-pressure relief valve, a high-pressure cooler, a high-pressure pressure sensor and a high-pressure temperature sensor in succession along the oil flow direction.

Further, the filtering fineness of the high-pressure oil suction filter is 40-50 micrometers.

Further, there is a high-pressure oil inlet filter disposed between the high-pressure relief valve and the high-pressure cooler.

Further, the filtering fineness of the high-pressure oil inlet filter is 10-25 micrometers.

Further, a parameter value is set for the high-pressure relief valve, when the oil pressure is higher than the parameter value, the high-pressure relief valve is opened, and the lubricating oil return into the oil tank.

Further, the parameter value set for the high-pressure relief valve is 400 PSI.

Further, a temperature parameter is set for the high-pressure cooler, when the oil temperature is higher than the set temperature parameter, the high-pressure cooler is opened for heat dissipation.

Further, the temperature parameter set for the high-pressure cooler is 40-45° C.

Further, the low-pressure oil inlet pipe is provided with a low-pressure oil suction filter, a low-pressure oil pump, a low-pressure relief valve, a low-pressure cooler, a low-pressure pressure sensor and a low-pressure temperature sensor in succession along the oil flow direction.

Further, the filtering fineness of the low-pressure oil suction filter is 40-50 micrometers.

Further, there is a low-pressure oil inlet filter disposed between the low-pressure relief valve and the low-pressure cooler.

Further, the filtering fineness of the low-pressure oil inlet filter is 10-25 micrometers.

Further, a low-pressure parameter value is set for the low-pressure relief valve, when the oil pressure is higher than the set low-pressure parameter value, the low-pressure relief valve is opened, and the lubricating oil return into the oil tank.

Further, the low-pressure parameter value set for the low-pressure relief valve is 200 PSI.

Further, a low-pressure temperature parameter is set for the low-pressure cooler, when the oil temperature is higher than the set low-pressure temperature parameter, the low-pressure cooler is opened for heat dissipation.

Further, the temperature parameter set for the low-pressure cooler is 40-45° C.

Further, the oil tank is provided with an oil tank temperature sensor.

Compared with the prior art, the invention has the following beneficial effects: providing a high-low pressure lubrication system for a high-horsepower plunger pump, to change the traditional lubrication method of "oil feed in one passage", in which oils are fed in two passages: a high-pressure oil line and a low-pressure oil line, the high-pressure oil line is primarily used for lubricating the connecting rod bearing bush and the crosshead bearing bush with higher lubrication requirements, while the low-pressure oil line is primarily used for lubricating the crankshaft bearings, the crosshead sliding rails, the reduction gearbox bearing, and the reduction gearbox gear pair with relatively lower lubrication requirements; two oil pumps are employed to supply oils so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities; both the high-pressure oil line and the low-pressure oil line utilize two-stage filtration, which can reduce impurities in the lubricating oil and improve the life time of various components in the plunger pump. The relief valve, the pressure sensor and the temperature sensor guarantee the operations of the entire lubrication system.

The invention will be illustrated in detail below with reference to accompanying drawings and the detailed description.

Wherein: 1. connecting rod bearing bush, 2. crosshead bearing bush, 3 crankshaft bearings, 4. crosshead upper sliding rail, 5. crosshead lower sliding rail, 6. reduction gearbox gear pair, 7. reduction gearbox bearing, 8. high-pressure oil line, 9. low-pressure oil line, 10. oil tank, 11. high-pressure oil suction filter, 12. high-pressure oil pump, 13 high-pressure relief valve, 14 high-pressure oil inlet filter, 15. high-pressure cooler, 16. low-pressure oil suction filter, 17. low-pressure oil pump, 18. low-pressure relief valve, 19. low-pressure oil inlet filter, 20. low-pressure cooler, 21. high-pressure pressure sensor, 22. high-pressure temperature sensor, and 23. oil tank temperature sensor.

DESCRIPTION OF THE EMBODIMENTS

Figure 1:
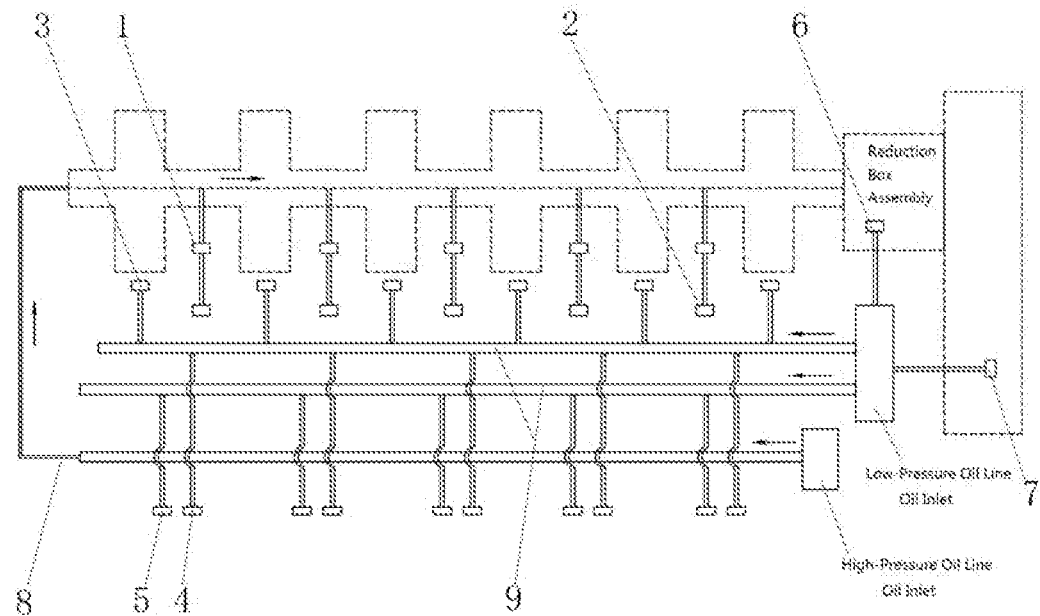
FIG. 1 is a schematic diagram of the high-pressure oil line and low-pressure oil line in the plunger pump of the invention.
Figure 2:
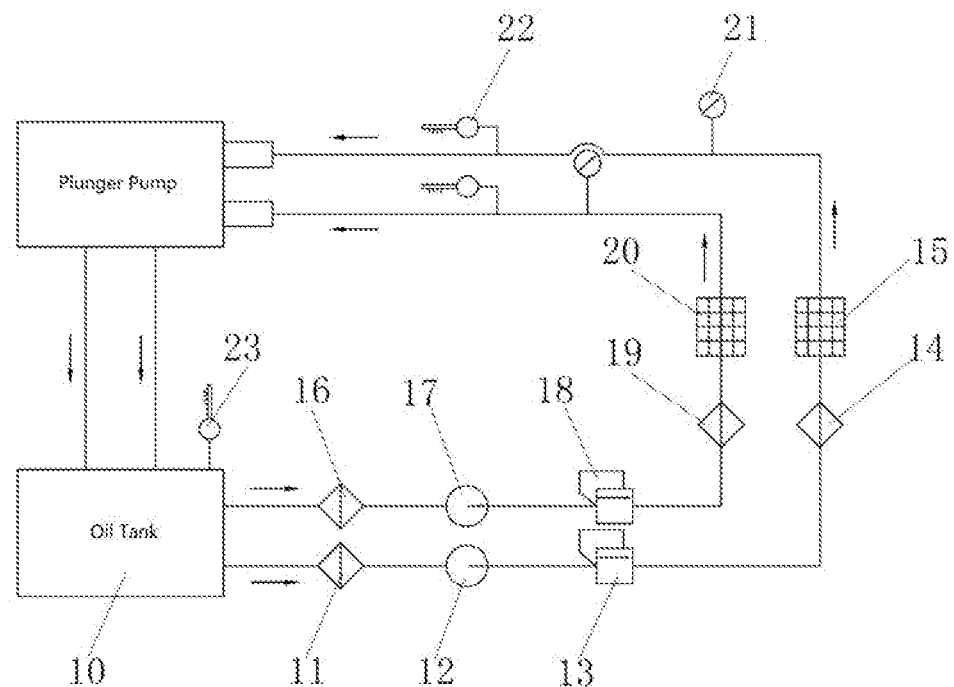
FIG. 2 is a schematic diagram of the oil supply system outside the plunger pump of the invention.

As shown in FIGS. 1 to 2, a high-low pressure lubrication system for a high-horsepower plunger pump, including a high-pressure oil line 8 and a low-pressure oil line 9, the high-pressure oil line 8 is used for lubricating the connecting rod bearing bushes 1 and the crosshead bearing bushes 2 in the plunger pump, the low-pressure oil line 9 is used for lubricating the crankshaft bearings 3, the crosshead sliding rails, the reduction gearbox bearing 7, and the reduction gearbox gear pair 6 in the plunger pump. The crosshead sliding rails include the crosshead upper sliding rail 4 and the crosshead lower sliding rail 5. Changing the traditional lubrication method of "oil feed in one passage", in the invention, oil is fed in two passages: a high-pressure oil line 8 and a low-pressure oil line 9, the high-pressure oil line 8 is primarily used for lubricating the connecting rod bearing bushes 1 and the crosshead bearing bushes 2 with higher lubrication requirements, while the low-pressure oil line 9 is primarily used for lubricating the crankshaft bearings 3, the crosshead sliding rails, the reduction gearbox bearing 7, and the reduction gearbox gear pair 6 with relatively lower lubrication requirements; two oil pumps are employed to supply oil so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities; for the connecting rod bearing bushes 1 and the crosshead bearing bushes 2, the fit clearance is small, the carried load is high, the contact area is large, and the requirements on lubrication are high. The lubricating oil line for the two bearing bushes is separated from other oil lines, and a high-pressure oil pump 12 is employed for oil supply separately, the lubricating oil are sufficient for better establishing the oil film, thus effectively reducing the wear of the two bearing bushes under high loads, taking away the heat caused from friction and impurities promptly, and improving the life time of the two bearing bushes.

The lubricating oil quantity of the high-low pressure lubrication system is 150-200 L/min.

The rated lubricating oil pressure of the high-pressure oil line is 200-350 PSI.

The rated lubricating oil pressure of the low-pressure oil line is 60-150 PSI.

At the oil inlet of the low-pressure oil line 9, independent lubricating oil lines are arranged for the reduction gearbox bearing 7 and the reduction gearbox gear pair 6 respectively. The rotational speeds of the reduction gearbox bearing 7 and the reduction gearbox gear pair 6 are both high, and they are supplied with oil separately, thus guaranteeing sufficient lubricating oil to effectively establish oil films, take away the heat caused from friction promptly and extend the life time.

The high-low pressure lubrication system for the high-horsepower plunger pump includes an oil supply system, which includes an oil tank 10, a high-pressure oil inlet pipe, a low-pressure oil inlet pipe, a high-pressure oil return pipe, and a low-pressure oil return pipe, wherein the oil outlet of the oil tank 10 is connected to the oil inlet of the high-pressure oil line 8 of the plunger pump through the high-pressure oil inlet pipe, the oil outlet of the oil tank 10 is connected to the oil inlet of the low-pressure oil line 9 of the plunger pump through the low-pressure oil inlet pipe, the oil outlet of the high-pressure oil line 8 of the plunger pump is connected into the oil tank 10 through the high-pressure oil return pipe, the oil outlet of the low-pressure oil line 9 of the plunger pump is connected into the oil tank 10 through the low-pressure oil return pipe, the high-pressure oil inlet pipe is in parallel with the low-pressure oil inlet pipe, the high-pressure oil return pipe is in parallel with the low-pressure oil return pipe. Independent high-pressure oil inlet-oil return and low-pressure oil inlet-oil return are respectively employed to effectively satisfy different lubrication requirements for various lubricating points in the plunger pump. For high lubrication requirements, oil is supplied independently at high pressure, to realize the distribution of oil inlet satisfying the individual needs.

The high-pressure oil inlet pipe is provided with a high-pressure oil suction filter 11, a high-pressure oil pump 12, a high-pressure relief valve 13, a high-pressure oil inlet filter 14 and a high-pressure cooler 15 in succession along the oil flow direction.

The filtering fineness of the high-pressure oil suction filter 11 is 40-50 micrometers, the filtering fineness of the high-pressure oil inlet filter 14 is 10-25 micrometers. The high-pressure oil inlet pipe employs double filtration with a higher filtering fineness, which can reduce the impurities in the lubricating oil and extend the life time of various components in the plunger pump.

A parameter value is set for the high-pressure relief valve 13, when the lubricating oil pressure is higher than the parameter value, the high-pressure relief valve 13 is opened, and the lubricating oil return into the oil tank 10; when the lubricating oil pressure is normal, the high-pressure relief valve 13 is closed. The parameter value set for the high-pressure relief valve is 400 PSI.

A temperature parameter is set for the high-pressure cooler 15, when the oil temperature is higher than the set temperature parameter, the high-pressure cooler 15 is opened for heat dissipation. The lubricating oil is cooled by heat dissipation to ensure that the lubricating oil entering the high-pressure oil line 8 within normal operating temperature ranges.

The temperature parameter set for the high-pressure cooler is 40-45° C.

The low-pressure oil inlet pipe is provided with a low-pressure oil suction filter 16, a low-pressure oil pump 17, a low-pressure relief valve 18, a low-pressure oil inlet filter 19 and a low-pressure cooler 20 in succession along the oil flow direction.

The filtering fineness of the low-pressure oil suction filter 16 is 40-50 micrometers, the filtering fineness of the low-pressure oil inlet filter 19 is 10-25 micrometers. The low-pressure oil inlet pipe employs double filtration with a higher filtering fineness, which can reduce the impurities in the lubricating oil and extend the life time of various components in the plunger pump.

A low-pressure parameter value is set for the low-pressure relief valve 18, when the oil pressure is higher than the set low-pressure parameter value, the low-pressure relief valve 18 is opened, and the lubricating oil return into the oil tank 10; when the lubricating oil pressure is normal, the low-pressure relief valve 18 is closed. The low-pressure parameter value set for the low-pressure relief valve is 200 PSI.

A low-pressure temperature parameter is set for the low-pressure cooler 20, when the oil temperature is higher than the set low-pressure temperature parameter, the low-pressure cooler 20 is opened for heat dissipation. The lubricating oil is cooled by heat dissipation to ensure that the lubricating oil entering the low-pressure oil line 9 within normal operating temperature ranges.

The temperature parameter set for the low-pressure cooler is 40-45° C.

The high-pressure oil inlet pipe is provided with a high-pressure pressure sensor 21 and a high-pressure temperature sensor 22 at the end along the oil flow direction. The high-pressure pressure sensor 21 and the high-pressure temperature sensor 22 are used for detecting the pressure and temperature of the lubricating oil entering the high-pressure oil line 8.

The low-pressure oil inlet pipe is provided with a low-pressure pressure sensor and a low-pressure temperature sensor at the end along the oil flow direction. The low-pressure pressure sensor and the low-pressure temperature sensor are used for detecting the pressure and temperature of the lubricating oil entering the low-pressure oil line 9. The oil tank 10 is provided with an oil tank temperature sensor 23. The monitoring on the temperature of the entire high-low pressure lubrication system is achieved by the oil tank temperature sensor 23, the high-pressure temperature sensor 22 and the low-pressure temperature sensor. Operating ranges are set on the high-pressure pressure sensor 21, the high-pressure temperature sensor 22, the low-pressure pressure sensor, the low-pressure temperature sensor and the oil tank temperature sensor 23, during operations, the oil supply is adjusted automatically by monitoring the changes of the temperature and pressure of the lubricating oil to guarantee sufficient oil supply.

It will be appreciated to persons skilled in the art that the invention is not limited to the foregoing embodiments, which together with the context described in the specification are only used to illustrate the principle of the invention. Various changes and improvements may be made to the invention without departing from the spirit and scope of the invention. All these changes and improvements shall fall within the protection scope of the invention. The protection scope of the invention is defined by the appended claims and equivalents thereof.

What is claimed is:

1. A high-low pressure lubrication system for a high-horsepower plunger pump, comprising a high-pressure oil line and a low-pressure oil line, the high-pressure oil line is used for lubricating the connecting rod bearing bushes and the crosshead bearing bushes in the plunger pump, the low-pressure oil line is used for lubricating the crankshaft bearings, the crosshead sliding rails, the reduction gearbox bearing, and the reduction gearbox gear pair in the plunger pump, wherein the high-low pressure lubrication system for the high-horsepower plunger pump comprises an oil tank, a high-pressure oil inlet pipe, a low-pressure oil inlet pipe, a high-pressure oil return pipe, and a low-pressure oil return pipe, the oil outlet of the oil tank is connected to the oil inlet of the high-pressure oil line of the plunger pump through the high-pressure oil inlet pipe, the oil outlet of the oil tank is connected to the oil inlet of the low-pressure oil line of the plunger pump through the low-pressure oil inlet pipe, the oil outlet of the high-pressure oil line of the plunger pump is connected into the oil tank through the high-pressure oil return pipe, the oil outlet of the low-pressure oil line of the plunger pump is connected into the oil tank through the low-pressure oil return pipe, the high-pressure oil inlet pipe is in parallel with the low-pressure oil inlet pipe, the high-pressure oil return pipe is in parallel with the low-pressure oil return pipe, and the high-pressure oil inlet pipe is provided with a high-pressure oil suction filter, a high-pressure oil pump, a high-pressure relief valve, a high-pressure cooler, a high-pressure pressure sensor and a high-pressure temperature sensor in succession along the oil flow direction.

2. The high-low pressure lubrication system for the high-horsepower plunger pump according to claim 1, wherein the lubricating oil quantity of the high-low pressure lubrication system is 150-200 L/min.

3. The high-low pressure lubrication system for the high-horsepower plunger pump according to claim 1, wherein the rated lubricating oil pressure of the high-pressure oil line is 200-350 PSI.

4. The high-low pressure lubrication system for the high-horsepower plunger pump according to claim 1, wherein the rated lubricating oil pressure of the low-pressure oil line is 60-150 PSI.

5. The high-low pressure lubrication system for the high-horsepower plunger pump according to claim 1, wherein at the oil inlet of the low-pressure oil line, independent lubricating oil lines are arranged for the reduction gearbox bearing and the reduction gearbox gear pair respectively.

6. The high-low pressure lubrication system for the high-horsepower plunger pump according to claim 1, wherein the oil tank is provided with an oil tank temperature sensor.

7. The high-low pressure lubrication system for the high-horsepower plunger pump according to claim 1, wherein the filtering fineness of the high-pressure oil suction filter is 40-50 micrometers.

8. The high-low pressure lubrication system for the high-horsepower plunger pump according to claim 1, wherein there is a high-pressure oil inlet filter disposed between the high-pressure relief valve and the high-pressure cooler.

9. The high-low pressure lubrication system for the high-horsepower plunger pump according to claim 8, wherein the filtering fineness of the high-pressure oil inlet filter is 10-25 micrometers.

10. The high-low pressure lubrication system for the high-horsepower plunger pump according to claim 1, wherein a parameter value is set for the high-pressure relief valve, when the oil pressure is higher than the parameter value, the high-pressure relief valve is opened, and the lubricating oil return into the oil tank.

11. The high-low pressure lubrication system for the high-horsepower plunger pump according to claim 10, wherein the parameter value set for the high-pressure relief valve is 400 PSI.

12. The high-low pressure lubrication system for the high-horsepower plunger pump according to claim 1, wherein a temperature parameter is set for the high-pressure cooler, when the oil temperature is higher than the set temperature parameter, the high-pressure cooler is opened for heat dissipation.

13. The high-low pressure lubrication system for the high-horsepower plunger pump according to claim 12, wherein the temperature parameter set for the high-pressure cooler is 40-45° C.

14. A high-low pressure lubrication system for the high-horsepower plunger pump, comprising a high-pressure oil line and a low-pressure oil line, the high-pressure oil line is used for lubricating the connecting rod bearing bushes and the crosshead bearing bushes in the plunger pump, the low-pressure oil line is used for lubricating the crankshaft bearings, the crosshead sliding rails, the reduction gearbox bearing, and the reduction gearbox gear pair in the plunger pump, wherein the high-low pressure lubrication system for the high-horsepower plunger pump comprises an oil tank, a high-pressure oil inlet pipe, a low-pressure oil inlet pipe, a high-pressure oil return pipe, and a low-pressure oil return pipe, the oil outlet of the oil tank is connected to the oil inlet of the high-pressure oil line of the plunger pump through the high-pressure oil inlet pipe, the oil outlet of the oil tank is connected to the oil inlet of the low-pressure oil line of the plunger pump through the low-pressure oil inlet pipe, the oil outlet of the high-pressure oil line of the plunger pump is connected into the oil tank through the high-pressure oil return pipe, the oil outlet of the low-pressure oil line of the plunger pump is connected into the oil tank through the low-pressure oil return pipe, the high-pressure oil inlet pipe is in parallel with the low-pressure oil inlet pipe, the high-pressure oil return pipe is in parallel with the low-pressure oil return pipe, and wherein the low-pressure oil inlet pipe is provided with a low-pressure oil suction filter, a low-pressure oil pump, a low-pressure relief valve, a low-pressure cooler, a low-pressure pressure sensor and a low-pressure temperature sensor in succession along the oil flow direction.

15. The high-low pressure lubrication system for the high-horsepower plunger pump according to claim 14, wherein the filtering fineness of the low-pressure oil suction filter is 40-50 micrometers.

16. The high-low pressure lubrication system for the high-horsepower plunger pump according to claim 14, wherein there is a low-pressure oil inlet filter disposed between the low-pressure relief valve and the low-pressure cooler.

17. The high-low pressure lubrication system for the high-horsepower plunger pump according to claim 16, wherein the filtering fineness of the low-pressure oil inlet filter is 10-25 micrometers.

18. The high-low pressure lubrication system for the high-horsepower plunger pump according to claim 14, wherein a low-pressure parameter value is set for the low-pressure relief valve, when the oil pressure is higher than the set low-pressure parameter value, the low-pressure relief valve is opened, and the lubricating oil return into the oil tank.

19. The high-low pressure lubrication system for the high-horsepower plunger pump according to claim 18, wherein the low-pressure parameter value set for the low-pressure relief valve is 200 PSI.

20. The high-low pressure lubrication system for the high-horsepower plunger pump according to claim 14, wherein a low-pressure temperature parameter is set for the low-pressure cooler, when the oil temperature is higher than the set low-pressure temperature parameter, the low-pressure cooler is opened for heat dissipation.

21. The high-low pressure lubrication system for the high-horsepower plunger pump according to claim 20, wherein the temperature parameter set for the low-pressure cooler is 40-45° C.

* * * * *